Nov. 1, 1938.  H. KRAEKEMIER  2,134,721
STEERING MECHANISM
Filed April 2, 1936  2 Sheets-Sheet 2
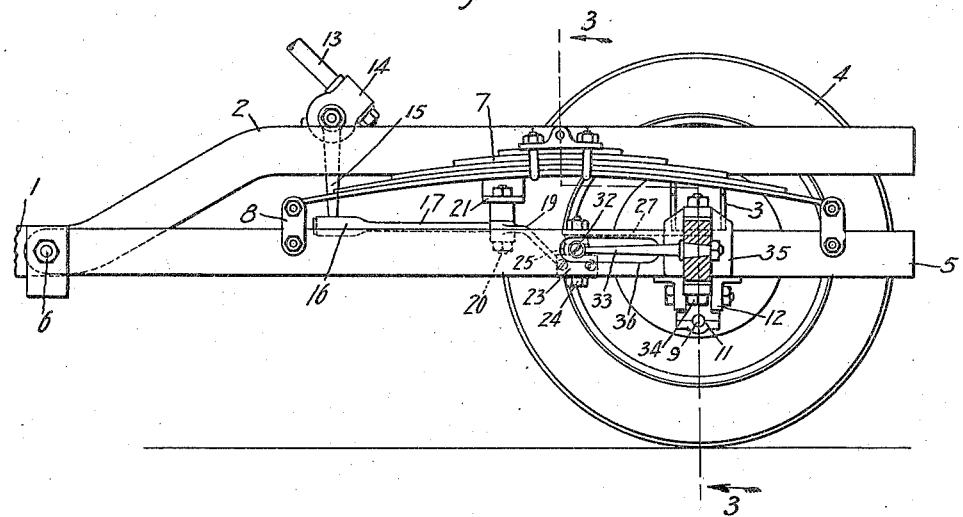
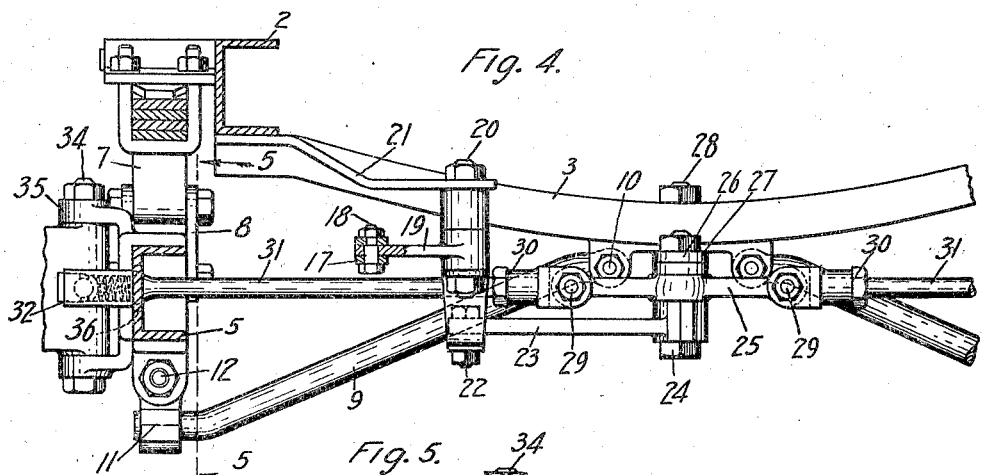
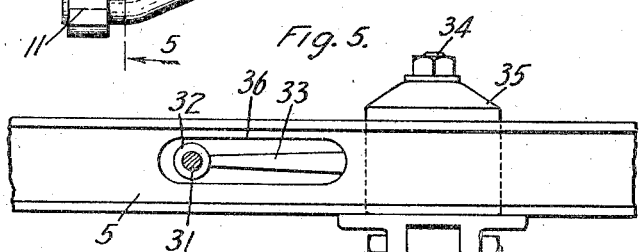

Patented Nov. 1, 1938

2,134,721

UNITED STATES PATENT OFFICE 2,134,721

STEERING MECHANISM

Herman Kraekemier, Bridgeport, Conn.

Application April 2, 1936, Serial No. 72,368

11 Claims. (Cl. 280—95)

My invention relates to steering mechanism.

It has among its objects to provide an improved automobile steering mechanism, and more particularly an improved steering mechanism especially adapted to use with independently sprung wheels. A further object of my invention is to provide an improved and simplified steering mechanism including an improved sectional tie rod structure which permits independent springing of the wheels, and which further forms a part of an improved actuating connection for the wheels while continuing to perform its function as a tie rod. A still further object is to provide an improved steering mechanism which is especially adapted to cooperate with independently sprung wheels carried on supplementary wheel carrying frame members pivoted at their rear ends to the main frame and underlying the front end of the latter, while connected thereto by longitudinally extending leaf springs and movable substantially vertically, all as described and claimed in a co-pending application Serial No. 23,016, filed May 23, 1935. These and other objects and advantages of my improved construction will, however, hereinafter more fully appear.

In the accompanying drawings, I have shown for purposes of illustration one embodiment which my invention may assume in practice.

In these drawings—

Fig. 2 is a sectional view partially in side elevation on line 2—2 of Fig. 1;

Fig. 4 is an enlarged view on line 4—4 of Fig. 1, and

Fig. 5 is a detail sectional view on line 5—5 of Fig. 4.

Figure 1:
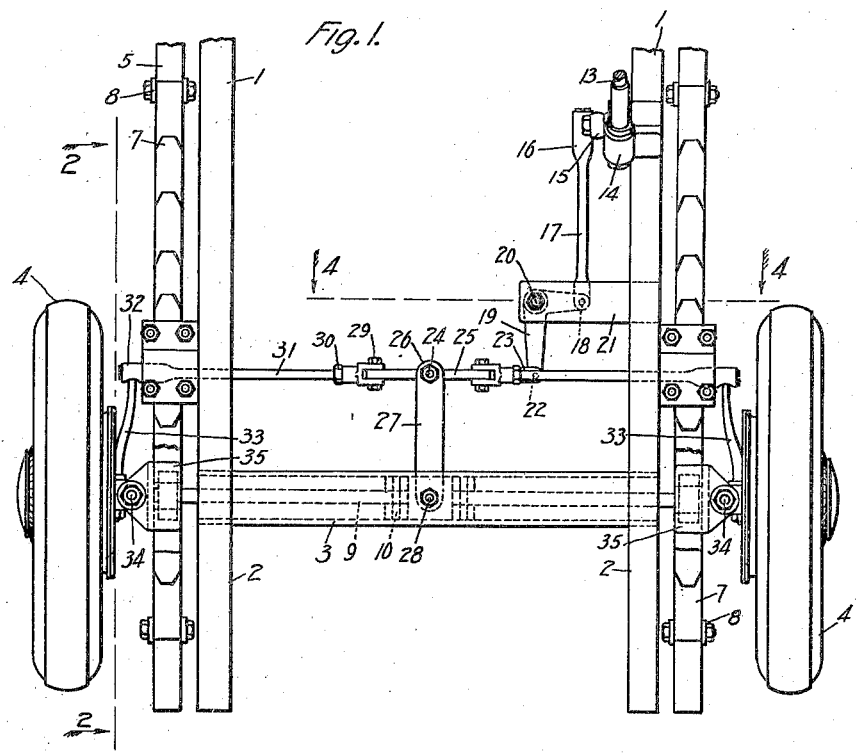
Fig. 1 is a top plan view of the front end of an automobile frame equipped with my improvements.
Figure 3:
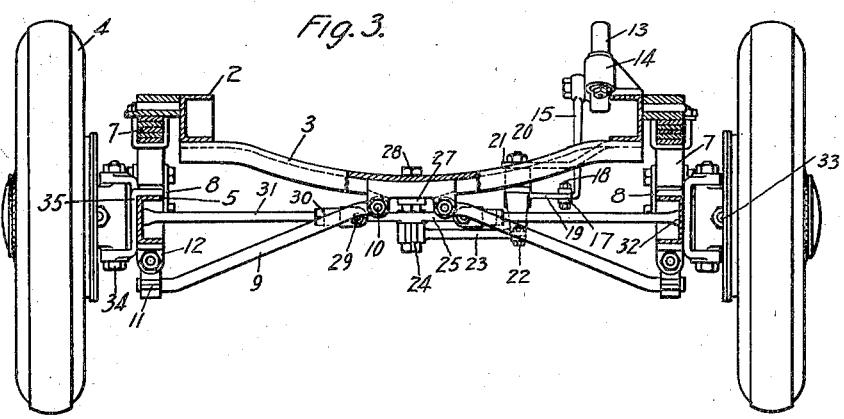
Fig. 3 is a sectional view on line 3—3 of Fig. 2.

In this illustrative construction, I have shown my invention applied to a spring mechanism including a main frame 1 having upwardly bent and longitudinally extending front portions comprising laterally spaced main frame members 2 connected by a transverse member 3 providing a suitable engine support; the wheels 4 being carried on vertically swinging supplementary frame members 5 which are disposed outside the members 2 and below the latter and are pivoted to the main frame at their rear ends as at 6. Further, it will be noted that longitudinally disposed leaf springs 7 carried on the members 2 are suitably connected, as by shackles 8 at the opposite ends of the springs, to the members 5 in front and rear of the wheel axes, and that transverse rods 9 are pivoted at 10 to the underside of the member 3 and have their opposite extremities fixed at 11 to longitudinally extending swivels 12 on the underside of the members 5 below the wheel axes.

In applying steering mechanism to such a construction, I have devised an improved structure whereby, while continuing to obtain the advantages of the substantially vertical movement of the members 5 and of the longitudinally extending leaf springs 7, it is also possible to obtain effective steering in all positions of the wheels 4. Further, at the same time, I have provided an improved and simplified steering mechanism utilizing an improved tie rod structure as the means for transmitting the steering movements to the wheels, while also providing an improved flexible or sectional tie rod and cooperating swinging wheel carrying frame construction which permits entire freedom of wheel movement of the independently sprung wheels and members 5, as well as of the steering mechanism in all positions of the parts.

Referring more particularly to the steering mechanism, it will be observed that the steering post 13 has a usual worm connection 14 suitably mounted on one of the main frame members 2. The worm connection 14 also has a depending swinging member 15 inside that frame member which is suitably connected, as by a usual spring and ball connection 16, with the rear end of a longitudinally extending rod 17. This rod or link at its front end is pivotally connected on a vertical pivot 18 with a horizontally swinging bell crank 19 which is, in turn, pivoted at 20 on a suitable bracket 21 carried by the adjacent member 2 and extending inward laterally therefrom. The front arm of the bell crank 19 is herein also bent downwardly and pivoted by a vertical pivot 22 to a normally transversely disposed link or arm 23, which is, in turn, suitably fixed, as by a vertical bolt 24, to a transversely disposed short connecting member 25, the bolt 24 herein being located midway between the ends of the member 25. Here, note also that this member 25 is pivotally mounted on the bolt 24 in the rear end 26 of a link 27 which is, in turn, pivoted at its front end on a vertical pivot 28 to the member 3 midway between the pivotal connections 10 heretofore described. As shown, the member 25 is also suitably connected, as by horizontal pivots 29 and adjustable connections 30, to transversely disposed tie rod sections 31 which are also connected by usual ball and spring connections 32 at their outer ends, to rearwardly extending straight arms 33, herein of the same effective length of the member 27, carried by the wheels 4. It will be noted that the tie-rod sections 31, the arms 5 and the steering arms 33 are located in substantially the same general horizontal plane, as will be apparent from inspection of Figure 4 which shows a vertical view, partly in section, of these elements. Also, it will be noted that these wheels are, in turn, pivoted on vertical pivots 34 on brackets 35 fixed to the outside of the lower spring connected wheel carrying frame members 5, and that each of the rods 31 herein extends laterally through an elongated slot 36 in one of these frame members 5.

In the operation of my improved construction, it will be apparent that, with the car in motion, each wheel 4 will be free to move with its frame member 5 as the latter moves vertically within the limits determined by the spring 7, each wheel and member 5 moving about the pivot 6 in the substantially vertical path prescribed for the frame member 5. Further, due to my improved construction, it will be evident that, as each wheel 4 thus moves, it will remain constantly under the control of the steering mechanism described, the rods 31 being freely movable vertically about their pivots 29 to the member 25, while the slots 36 also permit free movement of the parts. The member 25 is also free at all times for actuation in a transverse direction with respect to the car frame by the member 23 which is always connected to and operable by the bell crank 19 which is, in turn, operative at any time by the members 17 and 15 operable by the rotation of the steering post 13. Further, it will be observed that, due to the provision of the pivoted member 27, to the outer end of which member 25 is pivoted, the latter member and rods 31 are maintained in the necessary relationship to one another and the members 33 carried by the wheels, in such manner as to enable effective steering in all angular positions of the bell crank 19, and also in all corresponding positions of the member 23 which forms the connecting member between the bell crank 19 and the member 25, irrespective of any variation in the vertical position of the wheels 4 or either of the same.

As a result of my improved construction, it is made possible not only to eliminate altogether the previously used rigid tie rod, but also to provide an improved sectional connection which not only performs the functions of the tie rod, but which also is adapted to use with independently sprung wheels. Attention is further directed to the fact that in the particular embodiment illustrated here, this improved steering mechanism with its sectional tie-rod is also adapted to use with independently sprung wheels carried on the improved substantially vertically moving supplemental spring connected frames described, whereby scrubbing of the tires is effectually prevented at the same time that improved and markedly effective springing is obtained. More particularly, it will be observed that herein the steering mechanism functions through slots 36 in the members 5 in such manner as to enable the transverse tie-rods 31 not only to be disposed above the bottom of the arms 5 in such manner as to increase road clearance, but also to enable these rods 31 to be protected by the members 5 and make possible the use of strong steering arms 33 which are substantially straight and free from objectionable torsion or resiliency, while being disposed in the same general horizontal planes as the rods 31 and also acting in the planes of the members 5. These and other advantages of my improved construction will, however, be clearly apparent to those skilled in the art.

While I have in this application specifically described one embodiment which my invention may assume in practice, it will be understood that this form of the same is chosen for purposes of illustration, and that my invention may be modified and embodied in various other forms without departing from its spirit or the scope of the appended claims.

What I claim as new and desire to secure by Letters Patent is:

1. In a vehicle, the combination of a vehicle frame having side members and a transverse member interconnecting the same, arms at the sides of the frame, wheels having stub axles carried by said arms and having rearwardly directed steering arms, pivot means for pivoting said first mentioned arms to the side members of the frame, additional means for connecting the outer ends of said arms to the transverse member so that said first mentioned arms swing lengthwise of the vehicle, springs interposed between the wheel carrying arms and the side members of the vehicle frame, a tie-rod structure having articulated parts mounted on said transverse member and extending through said first mentioned arms in certain positions thereof and connected to said steering arms and operative in all positions of said first mentioned arms, and mechanism for imparting movement to said tie-rod structure.

2. In a vehicle, the combination of a vehicle frame having side members and transverse means interconnecting the same, arms at the sides of said frame, wheels having stub axles carried by said arms and having rearwardly directed steering arms, pivot means for pivoting said first mentioned arms to the side members of said frame for up and down movement, spring biasing means for said first mentioned arms, a tie-rod structure having articulated parts mounted on said transverse means including transverse parts pivotally connected to said steering arms and disposed between the tops and bottoms of said first mentioned arms in all positions of the latter, and mechanism for imparting movement to said tie-rod structure in all positions of said first mentioned arms.

3. In a vehicle, the combination of a vehicle frame having side members and transverse means interconnecting the same, arms at the sides of said frame, wheels having stub axles carried by said arms and having rearwardly directed steering arms, pivot means for pivoting said first mentioned arms to the side members of said frame for up and down movement, spring biasing means for said first mentioned arms, a tie-rod structure having articulated parts mounted on said transverse means including transverse parts pivotally connected to said steering arms and disposed for independent non-conflicting movement with respect to said first mentioned arms and extending through said first mentioned arms in certain positions of the latter, and mechanism for imparting movement to said tie-rod structure in all positions of said first mentioned arms.

4. In a vehicle, a combination of a vehicle frame having side members and transverse means connecting the same, arms at the sides of the frame having lateral apertures intermediate their ends, pivot means for pivoting said arms to the side members of the frame so that said arms swing up and down about said pivoted means, spring biasing means for said arms, wheels movable up and down as said arms move about said pivot means and having stub axles provided with rearwardly directed steering arms, a tie-rod structure having articulated parts mounted on said transverse means including transverse parts pivotally connected to said steering arms and extending through said apertures in said pivoted arms to operate in all positions thereof, and mechanism for imparting movement to said tie-rod structure.

5. A combination of a vehicle frame having side members and transverse means connecting the same, arms at the sides of the frame, wheels having stub axles carried by said arms and having rearwardly directed steering arms, pivoted means for pivoting said first mentioned arms to the side members of said frame for up and down movement, spring biasing means for said first mentioned arms, a tie-rod structure having articulated parts mounted on said transverse means including transverse parts pivotally connected to said steering arms and having portions thereof extending in substantially the same plane as said steering arms and said first mentioned arms and through the latter in certain positions thereof, and mechanism for imparting movement to said tie-rod structure.

6. In a vehicle, a combination of a vehicle frame having side members, forwardly directed arms having apertures therein and pivoted to said side members, means for connecting the outer ends of said side arms to said frame between said side members to permit said arms to move up and down, wheels carried by said arms, spring biasing means for said arms, a link pivoted at one end to said frame between said side members and extending rearwardly therefrom, substantially straight steering arms carried by said wheels, a member pivoted to the rear of said link, tie-rod sections pivotally connected to the ends of said last mentioned member and connected to said substantially straight steering arms, portions of said tie-rod sections extending in substantially the same planes as said steering arms and through the apertures in said first mentioned arms, and mechanism for imparting movement to said tie-rod structure.

7. In a vehicle, the combination of a vehicle frame having side members and a transverse member interconnecting the same, arms at the sides of the frame, pivot means for pivoting the arms to the side members of the frame so that said arms swing in substantially vertical planes lengthwise of the vehicle and substantially parallel to said side members, wheels having stub axles carried by said arms and having rearwardly directed steering arms, springs interposed between the wheel carrying arms and the side members of the vehicle frame, a tie-rod structure having articulated parts mounted on said transverse member and flexibly connected to said steering arms, and mechanism for imparting movement to said tie-rod structure, said articulated parts extending through apertures in said pivoted arms to operate in all vertical positions thereof.

8. In a vehicle, the combination of a vehicle frame having side members and a transverse member interconnecting the same, forwardly directed arms pivoted to said side members, means for connecting the outer ends of said arms to the transverse member to permit the arms to move relative to said side members, wheels carried by said arms, springs suspending said arms, a link pivoted at one end to said transverse member and extending rearwardly therefrom, steering arms carried by said wheels, a member pivoted to the rear end of said link, tie-rod sections pivotally connected to the ends of said last named member and extending through said forwardly directed arms and connected to said steering arms, a steering post, and means operable from said post for shifting said last-named member and its pivotally connected tie-rod sections transversely of the frame without binding.

9. In a vehicle, the combination of a vehicle frame having a rigid transverse member, independently sprung wheel carrying members and wheels at the sides of said frame, steering arms carried by said wheels, a link pivoted to said transverse member to move in a horizontal plane and extending rearwardly from said member, a member pivoted intermediate of its ends to the rear end of said link, laterally flexible connections between the respective ends of said last-named member and said steering arms extending through said wheel carrying members, and mechanism including a link member pivoted to said last-named member coincidently with its pivotal connection with said link for imparting movement to the last-named member and said connections transversely of the frame without binding.

10. In a vehicle, the combination of a vehicle frame having side members and a transverse member interconnecting said side members, independently sprung wheel carrying members and wheels connected to the side members of the frame and carrying steering arms, a link member pivoted to and extending rearwardly from said transverse member, an elongated member pivoted intermediate of its ends to the rear end of said link, laterally flexible connections between the ends of said member and said steering arms and extending through said wheel carrying members, and mechanism connected to said elongated member intermediate of its ends for moving it and said connections transversely of the frame without binding.

11. In a vehicle, the combination of a vehicle frame having side members and a transverse member interconnecting said side members, independently sprung wheel carrying members and wheels connected to said side members, a link pivoted to and extending rearwardly from the transverse member at the intermediate portion of the latter, an elongated member pivoted intermediate of its ends to the rear end of said link, steering arms on said wheels, laterally flexible connections between the ends of said member and the respective steering arms and extending through said wheel carrying members, an operating link pivoted to the intermediate portion of said elongated member for moving it and said connections transversely of the frame without binding, a bell crank pivoted to said operating link, and means for operating said bell crank.

HERMAN KRAEKEMIER.

CERTIFICATE OF CORRECTION.

Patent No. 2,134,721.   November 1, 1938.

HERMAN KRAEKEMIER.

It is hereby certified that error appears in the printed specification of the above numbered patent requiring correction as follows: Page 3, second column, line 10, claim 8, after the word "connected" insert for vertical movement only; and that the said Letters Patent should be read with this correction therein that the same may conform to the record of the case in the Patent Office.

Signed and sealed this 7th day of March, A. D. 1939.

Henry Van Arsdale.

(Seal)   Acting Commissioner of Patents.